US006115897A

United States Patent [19]

Beals, Jr. et al.

[11] Patent Number: 6,115,897

[45] Date of Patent: Sep. 12, 2000

[54] HOLLOW D" GASKET ROLLER

[75] Inventors: Harry C. Beals, Jr., Jackson; Claude W. Duvall, Flanders; Ralph Liguori, Oakland; Ronald B. Walsh, Hacketstown, all of N.J.

[73] Assignee: Lucent Technologies Inc, Murray Hill, N.J.

[21] Appl. No.: 09/271,345

[22] Filed: Mar. 18, 1999

[51] Int. Cl.[7] .......... B23P 19/02

[52] U.S. Cl. .......... 29/235; 29/451

[58] Field of Search .......... 29/235

[56] References Cited

U.S. PATENT DOCUMENTS 4,790,059 12/1988 Killpack .......... 29/451
5,058,254 10/1991 Vlahogeorge .......... 29/235
5,072,471 12/1991 Isler .......... 7/158
5,155,890 10/1992 Goedderz .......... 29/235
5,345,662 9/1994 Gosselin et al. .......... 29/235

*Primary Examiner*—David A. Scherbel
*Assistant Examiner*—Daniel Shanley

[57] ABSTRACT

A hand tool for compressing a "Hollow D" gasket against an edge surface of a panel, door or cabinet frame including a handle, and also including a stepped-roller having a raised section for applying direct pressure substantially only at the central area of the gasket overlying the adhesive strip on its back surface, and not to its side areas, for allowing thorough wetting of the adhesive along the edge surface to be secured.

9 Claims, 3 Drawing Sheets

HOLLOW D" GASKET ROLLER

BACKGROUND OF THE INVENTION

1. Field of the Invention

This invention relates to “Hollow D” gaskets, in general, and to such gaskets as are commonly employed in the sealing of a panel, door or cabinet frame, in particular.

2. Description of the Related Art

With the advent of housed Personal Communication Systems and similar cellular Base Stations has come the requirement to seal them against leakage of electromagnetic radiation, and against snow, sleet and rain operative to deleteriously affect the electronic equipment enclosed therein, for example. With the frequent maintenance and servicing needs of the equipment, those skilled in the art will appreciate the many number of times that these housings are required to be opened, and then closed. Such constant use has revealed that the standard “Hollow D” gasket typically employed to seal the housing against the electromagnetic interference, and against the environmental factors, exhibited a significant tendency to detach from the housing frame—to the extent that interference leakage could exceed Federal Communications Commission regulations. Analysis of the situation led to a realization that the problem revolved about the adhesion of the “Hollow D” gasket.

In particular, it was determined that in installing the gasket to the frame, sometimes an excessive amount of pressure was applied, while at other times an insufficient amount of pressure was applied. When a “stencil-type” cylindrical roller provided by the gasket manufacturer was employed to install the gasket with the frame, utilizing an excessive amount of pressure to adhere it tended to damage the gasket entirely; using an insufficient amount of pressure, on the other hand, tended to create an air pocket along the adhesive strip on its back surface, causing the gasket never to completely contact the panel, door, or cabinet frame, allowing the gasket to eventually peel away over time. In either event, such a roller was found not very acceptable as a way to resolve the situation.

SUMMARY OF THE INVENTION

As will become clear from the following description, the “Hollow D” gasket roller of the present invention essentially comprises a hand tool for compressing the adhesive surface of the gasket against the panel, door or cabinet frame substrate by utilizing a “stepped” roller having a raised section to apply direct pressure substantially only to the adhesive area of the gasket and not to its side areas. As will be seen, the roller is operative with a coupled handle—and in a first embodiment of the invention, includes a raised section between opposite ends of the roller, with the roller having a first edge surface outwardly extending at a transverse angle from one of the opposite ends a distance equal to or greater than the distance the raised section extends outwardly from the roller. In this embodiment (particularly useful in cramped quarter installations), the roller is in the general shape of a cylinder having a central axis and a predetermined length, with the edge surface outwardly extending from one end of the roller at an angle substantially perpendicular to its central axis. With one side area of the gasket inserted to bear against the edge surface, and with the raised section extending along the roller a distance equal to or less than one-half its predetermined length, and with the distance between the raised section and the edge surface extension measured with respect to the central axis of the roller being less than the height of the “Hollow D” gasket to be compressed, the hand tool of this embodiment will be seen to allow thorough wetting of the gasket adhesive along the panel, door or cabinet frame to be sealed when rolling the tool.

In a second embodiment of the invention (useful where space limitations are not present), the “stepped” roller additionally includes a second edge surface outwardly extending at a transverse angle from the other of the opposite ends of the roller, also a distance equal to or greater than the distance the raised section extends outwardly from the roller, with the gasket fitted between the two edge surfaces. With the second edge surface similarly extending at a substantially perpendicular angle, and with the raised section positioned on the roller at a location generally equally spaced between the first and second edge surfaces, the thorough wetting of the gasket adhesive will be seen to follow when the length of the roller is selected slightly greater than the width of the “Hollow D” gasket to be compressed by rolling the hand tool. Here, too, in this second embodiment, the distance between the raised section of the roller and the two edge surface extensions measured with respect to the central axis of the roller is less than the height of the “Hollow D” gasket to be compressed, with the design profile permitting the join of the gasket adhesive substantially along the entire frame substrate.

Experimentation has shown that as long as the ratio between the distances of the raised section and the edge surface extensions are maintained, almost any size “stepped” roller can be utilized in pushing down on the center of the “Hollow D” gasket, and not on its side areas, overlying the pressure sensitive adhesive strip of the gasket, in preventing its center from arching during the rolling process and lessening the required adhesion to the substrate.

BRIEF DESCRIPTION OF THE DRAWINGS

These and other features of the invention will be more clearly understood from a consideration of the following description, taken in connection with the accompanying drawings, in which.

DETAILED DESCRIPTION OF THE INVENTION

Figure 5:
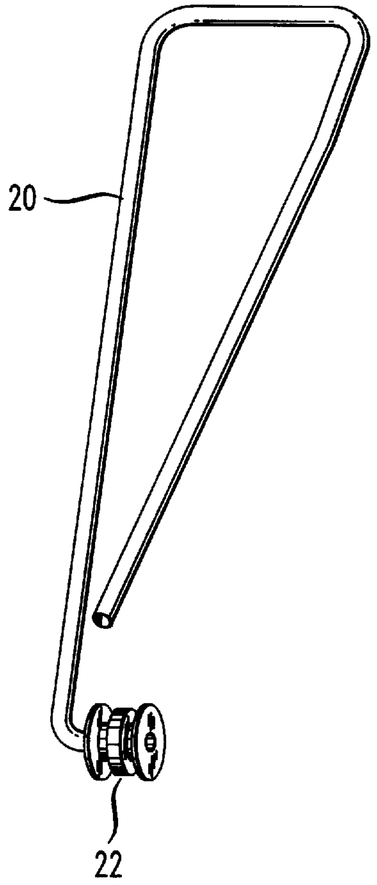
FIG. 5 is a pictorial representation of a handle operative with the rollers of FIGS. 1 and 2 in forming the hand tool to compress an adhesive surface of a “Hollow D” gasket according to the invention, as contrasted to a compression of its side areas.
Figure 6:
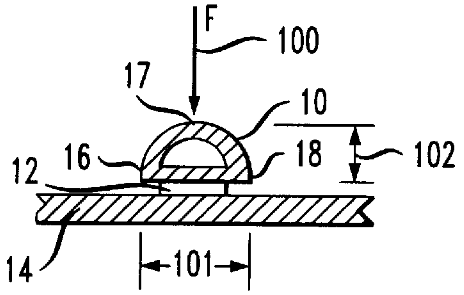
FIGS. 6, 7 and 8 are helpful in an understanding of the manner in which the hand tool of the invention allows a thorough wetting of the gasket adhesive along the frame substrate of a panel, door, or cabinet to be sealed.

As will be understood from FIG. 6, a sectional view of a “Hollow D” gasket 10 is illustrated, along with the adhesive strip carrier on its back surface 12 intended to be compressed against the substrate of a panel, door or cabinet frame 14, by means of a compressive force F perpendicularly applied to the gasket 10 in the direction of the arrow 100. In accordance with the realization of the present invention, for the adhesion to be successful, an adequate force F needs to be applied, pushing downward at substantially the central area 17 of the gasket 10 (as shown), overlying the pressure sensitive adhesive strip carrier 12, and not downward at the side areas 16, 18 of the gasket. In accomplishing this, a hand tool is shown in FIG. 5, as including a handle 20 (of any appropriate design or configuration), coupled with a "stepped" roller 22—although either of the rollers of FIGS. 1 or 2 may be employed.

Fabricated of stainless steel, for example, each "stepped" roller (24 in FIG. 1 and 26 in FIG. 2) is in the general shape of a cylinder 30A (FIG. 3) having a central axis 32 and a predetermined width 34A (FIG. 3) depending upon the width 101 of the gasket to be compressed by rolling the hand tool. As more clearly shown in FIGS. 1 and 3, the roller 24 includes an outwardly extending raised section 36 between its opposite ends 38, 40, and an edge surface 42 outwardly extending at a transverse angle from one of the two roller ends, as at 38. Preferably extending at an angle substantially perpendicular to the central axis 32, the edge surface 42 extends from the roller surfaces 57, 59 a distance 50, greater than the distance 52 which the raised section 36 extends from the roller surfaces 57, 59, both measured with respect to the axis 32. The raised section 36 here extends along the central axis 32 a distance preferably equal to one half the predetermined length 34A of the cylinder 30.

Figure 2:
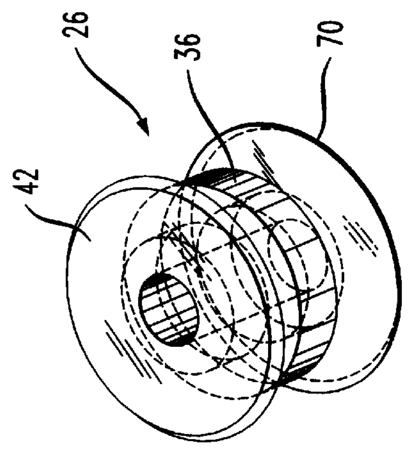
FIGS. 1 and 2 are computer generated perspective drawings showing the “stepped” rollers of the invention for use in cramped quarter and more general use installation, respectively.
Figure 4:
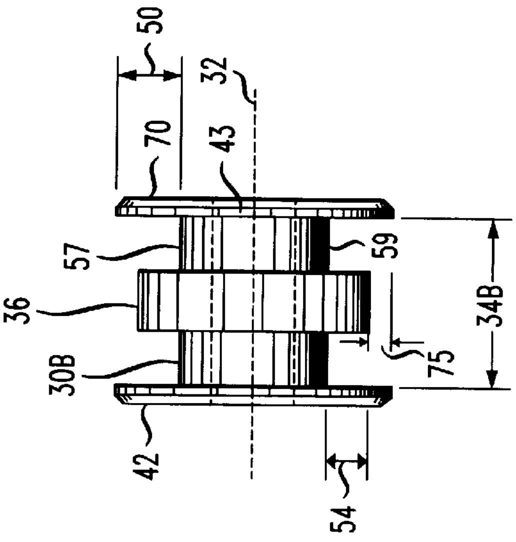
FIGS. 3 and 4 are front views of the rollers of FIGS. 1 and 2.
Figure 1:
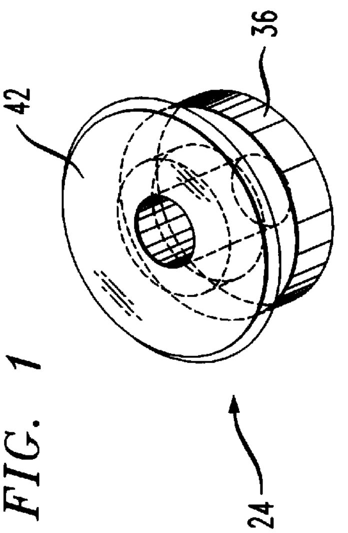
Figure 3:
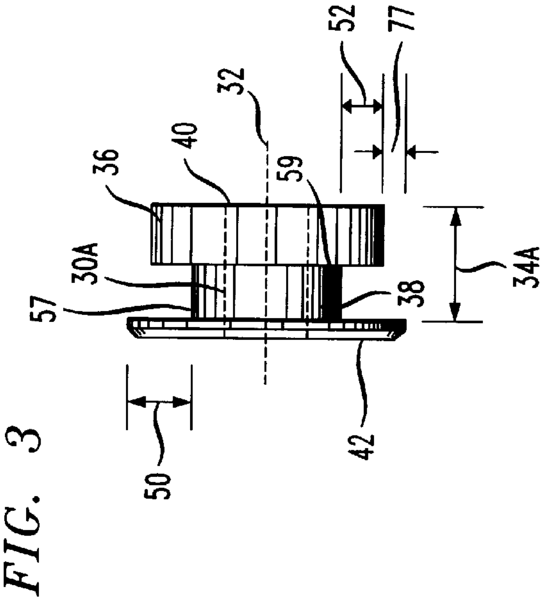

Particularly useful in sealing a panel, door or cabinet frame substrate in cramped or close quarters, the roller 24 of FIGS. 1 and 3 takes on a different, although comparably extended profile, for use where space limitations are not present. For such situation, roller 26 illustrated by the views of FIGS. 2 and 4, utilizes a second edge surface 70, similarly outwardly extending at a transverse angle from the other of the roller ends, as at 43, a like distance 50 from the roller surfaces 57, 59 greater than the distance the raised section 36 extends outwardly from the roller surfaces 57, 59, illustrated by the reference numeral 54, both with respect to the central axis 32. With the second edge surface 70 being at a comparable perpendicular angle with respect to the axis 32, it will be appreciated that the configuration of the "stepped" roller of FIGS. 2 and 4 is substantially a "double-sided" configuration, as compared with the "single-sided" design of FIGS. 1 and 3. Consistent with its more general usage, the length of the cylinder 30B of this "double-roller (FIG. 4) is larger than the length of the cylinder 30A of the "single-roller" of FIG. 3, and with the appreciation, according to the invention, that the distance between the two edge surfaces 42, 70 of FIGS. 2 and 4 is selected slightly greater than the width 101 of the "Hollow D" gasket 10 of FIG. 6, measured between its side areas 16 and 18. In such manner, the "Hollow D" gasket 10 fits wholly within the roller, between its defining edge surfaces 42, 70.

Figure 7:
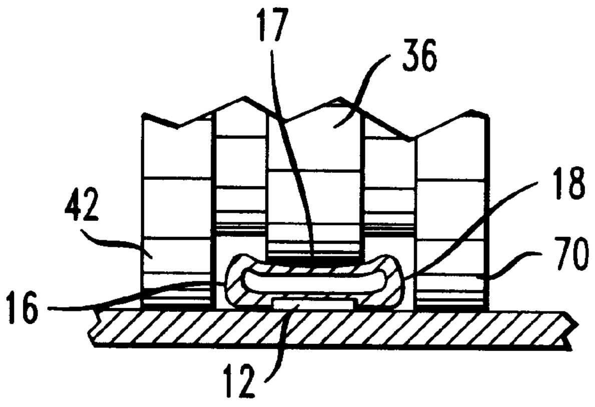

In accordance with this second embodiment of the invention, the raised section 36 of the "stepped" roller extends along its central axis 32 a distance preferably equal to one-half the predetermined length 34B of the cylinder 30B as measured between its edge surfaces 42, 70 (FIG. 4). By positioning the raised section 36 at a location substantially equally spaced between the two edge surfaces 42, 70, the effect of applying the compressive force F against the gasket 10 is as illustrated in FIG. 7. Specifically, the raised section 36 is forced downwardly by the roller action substantially at the center 17 of the "Hollow D" gasket, in the area overlying the adhesive strip carrier 12, while allowing the side areas 16, 18 to ride upwardly in the space formed between the raised section 36 and the adjacent edge surfaces 42, 70. The effect is to compress substantially only the central area 17 of the gasket when the distance 75 between the raised section 36 and the edge surfaces 42, 70 is less than the height 102 of the "Hollow D" gasket 10.

Figure 8:
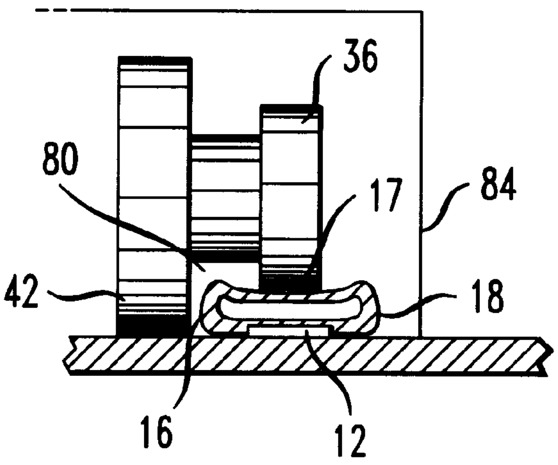

The illustration of FIG. 8 shows a like compression with the "stepped" roller of FIGS. 1 and 3, in which the raised section 36 compresses again substantially only the central area 17 of the "Hollow D" gasket, overlying the strip carrier 12, forcing it downwardly, while allowing the side area 16 to ride up within a groove 80 between the longer extending edge surface 42 and the raised section 36, and the side area 18 to ride up within a groove 82 between the raised section 36, and the frame substrate 84. Here, also, in accordance with the invention, the distance 77 between the raised section 36 and the edge surface 42 is selected less than the height 102 of the "Hollow D" gasket.

With either embodiment of the invention, it will be appreciated that the downward force applied by the roller moving along the length of the gasket strip under control of its handle adhesive area underlying the central area of the gasket, and not to its side areas. With such configuration, a thorough wetting of the adhesive results along the edge surface to which the gasket is to be secured, in preventing against electromagnetic radiation from the housing, or the incursion of such environmental factors as snow, sleet, rain, etc. into it.

While there have been described what are considered to be preferred embodiments of the present invention, it will be readily appreciated by those skilled in the art that modifications can be made without departing from the scope of the teachings herein. Thus, whereas the invention has been described for use with a typical type of "Hollow D" gasket, its concept of employing a "stepped" roller applies equally as well to any gasket design having a raised central area overlying an adhesive strip carrier. Similarly, whereas, perpendicular alignment of the edge surface(s) with respect to the cylindrical axis has been set forth in aligning the gasket when being fitted, other angular orientations may be selected instead to facilitate the insertion of the gasket to be secured. For at least such reasons, therefore, resort should be had to the claims appended hereto for a true understanding of the scope of the invention.

We claim:

1. A hand tool for compressing an adhesive surface of a Hollow D gasket of given height and width against an edge surface of a panel, door, or cabinet frame, comprising:

a roller; and a handle coupled to and operative with said roller;

with said roller having an outwardly extending raised section between opposite ends thereof to compress said gasket, with said roller also having a first edge surface outwardly extending at a transverse angle from one of said opposite ends of said roller for a distance greater than the distance which said raised section extends outwardly from said roller, and in a direction corresponding thereto; and with said roller being of a length slightly greater than the width of the Hollow D gasket to be compressed by said raised section.

2. The hand tool of claim 1 wherein said roller is in the general shape of a cylinder having a central axis and predetermined length, and wherein said first edge surface outwardly extends from said one end of said roller at an angle substantially perpendicular to said central axis.

3. The hand tool of claim 2 wherein said raised section extends along said roller a distance substantially equal to one-half said predetermined length.

4. The hand tool of claim 2 wherein the distance between said raised section and said first edge surface is less than the height of the Hollow D gasket to be compressed by said hand tool.

5. The hand tool of claim 1, with said roller also having a second edge surface outwardly extending at a transverse angle from the other of said opposite ends of said roller a distance greater than the distance said raised section extends outwardly from said roller, and in a direction also corresponding thereto.

6. The hand tool of claim 5 wherein said roller is in the general shape of a cylinder having a central axis and predetermined length, and wherein said first and said second edge surfaces outwardly extend from said opposite ends of said roller at angles substantially perpendicular to said central axis.

7. The hand tool of claim 6 wherein said raised section extends along said roller a distance substantially equal to one-half said predetermined length.

8. The hand tool of claim 7 wherein said raised section is positioned on said roller at a location substantially equally spaced between said first and said second edge surfaces.

9. The hand tool of claim 7 wherein the distance between said raised section and said first and said second edge surface is less than the height of the Hollow D gasket to be compressed by said hand tool.

* * * * *